US011899102B2

(12) United States Patent
Lincoln et al.

(10) Patent No.: US 11,899,102 B2
(45) Date of Patent: Feb. 13, 2024

(54) AUTONOMOUS MOVING OBJECT

(71) Applicant: Acconeer AB, Lund (SE)

(72) Inventors: Bo Lincoln, Lund (SE); Peter Almers, Limhamn (SE); Rikard Nelander, Lund (SE)

(73) Assignee: Acconeer AB, Lund (SE)

( * ) Notice: Subject to any disclaimer, the term of this patent is extended or adjusted under 35 U.S.C. 154(b) by 578 days.

(21) Appl. No.: 17/262,283

(22) PCT Filed: Jul. 4, 2019

(86) PCT No.: PCT/EP2019/067982
§ 371 (c)(1),
(2) Date: Jan. 22, 2021

(87) PCT Pub. No.: WO2020/020598
PCT Pub. Date: Jan. 30, 2020

(65) Prior Publication Data
US 2021/0302569 A1 Sep. 30, 2021

(30) Foreign Application Priority Data
Jul. 23, 2018 (EP) .................................... 18184942

(51) Int. Cl.
*G01S 13/931* (2020.01)
*G05D 1/02* (2020.01)
(Continued)

(52) U.S. Cl.
CPC ............ *G01S 13/931* (2013.01); *G01S 13/87* (2013.01); *G01S 13/9043* (2019.05);
(Continued)

(58) Field of Classification Search
CPC .... G01S 13/931; G01S 13/87; G01S 13/9043; G01S 2013/93271; G01S 2013/9318;
(Continued)

(56) References Cited

U.S. PATENT DOCUMENTS 7,586,434 B1 * 9/2009 Hamalainen ........ G01S 13/9019
342/25 R
2004/0204792 A1 10/2004 Taylor
(Continued)

FOREIGN PATENT DOCUMENTS

EP 1707987 A1 10/2006
WO 0159473 A2 8/2001
(Continued)

OTHER PUBLICATIONS

Paul Fritsche et al "Comparison of Two Radar-based Scanning-techniques for the Use in Robotic Mapping", Institute for Real Time Systems, Leibniz University Hanover, Applestr, 8 pages.
(Continued)

*Primary Examiner* — Jason Holloway
(74) *Attorney, Agent, or Firm* — Shih IP Law Group, PLLC (57) ABSTRACT

The disclosure relates to an autonomous moving object comprising: a radar sensor configured to scan a volume in front of the object, and a radar signal processor configured to: acquire a sequence of radar responses, each radar response of the sequence being acquired at a different position of the autonomous moving object, and perform synthetic aperture radar processing of at least parts of the acquired sequence of radar responses to obtain a synthetic aperture radar image representing response amplitude as a function of at least distance and angle with respect to the radar sensor, the autonomous moving object further comprising: a controller configured to detect presence of a potential obstacle within a pre-defined sub-volume in front of the autonomous moving object by analyzing the synthetic aperture radar image and, in response to detecting presence of a potential obstacle, output a control command configured (Continued)

to cause a changed movement of the autonomous moving object.

14 Claims, 5 Drawing Sheets

(51) Int. Cl.
*G01S 13/90* (2006.01)
*G01S 13/87* (2006.01)

(52) U.S. Cl.
CPC .. *G05D 1/0257* (2013.01); *G01S 2013/93271* (2020.01); *G05D 2201/0208* (2013.01); *G05D 2201/0215* (2013.01); *G05D 2201/0216* (2013.01)

(58) Field of Classification Search
CPC ......... G05D 1/0257; G05D 2201/0208; G05D 2201/0215; G05D 2201/0216
See application file for complete search history.

(56) References Cited

U.S. PATENT DOCUMENTS

| | | | | |
|---|---|---|---|---|
| 2006/0152402 | A1* | 7/2006 | Krikorian | G01S 13/9029 342/25 C |
| 2013/0293408 | A1* | 11/2013 | Underwood | G01S 13/42 342/146 |
| 2015/0336575 | A1 | 11/2015 | Zeng | |
| 2016/0097847 | A1* | 4/2016 | Loesch | G01S 13/931 342/156 |
| 2016/0103451 | A1* | 4/2016 | Vicenti | A47L 11/4066 700/259 |
| 2016/0131753 | A1 | 5/2016 | Brown | |
| 2016/0274580 | A1* | 9/2016 | Jung | G05D 1/0016 |
| 2017/0307746 | A1 | 10/2017 | Rohani | |
| 2018/0113210 | A1 | 4/2018 | Izadian | |
| 2018/0149742 | A1 | 5/2018 | Izadian | |

FOREIGN PATENT DOCUMENTS

| | | |
|---|---|---|
| WO | 0159473 A3 | 8/2001 |
| WO | 2008029038 A1 | 3/2008 |
| WO | 2012163403 A1 | 12/2012 |
| WO | 2015132361 A1 | 9/2015 |
| WO | 2017004524 A1 | 1/2017 |
| WO | 2017050798 A1 | 3/2017 |

OTHER PUBLICATIONS

International Search Report of PCT/EP2019/067982 dated Sep. 27, 2019.

* cited by examiner

AUTONOMOUS MOVING OBJECT

FIELD OF THE INVENTION

The present invention relates to an autonomous moving object. More specifically, the disclosure relates to an autonomous moving object configured to detect the presence of an obstacle in front of the object using radar.

BACKGROUND ART

Autonomous moving objects have become ubiquitous and find use in various applications. One popular type of autonomous moving objects is mobile cleaning robots, such as vacuum cleaners, sweeping cleaners or the like. Another popular type of autonomous moving object is robotic lawn mowers. Autonomous moving objects may use many different types of sensors for navigation, including radar sensors. A purpose of the sensors is to detect obstacles in front of the autonomous moving object, thus allowing the autonomous moving object to avoid obstacles. A single radar sensor using only one receiver and one transmitter antenna can sense depth in any direction which the antennas cover, but it cannot distinguish between different directions. A wide pattern (such as one typically obtained by e.g. a simple in-package antenna) will thus give a large ambiguity in where the detected object is in space. To resolve this ambiguity, multiple distance (radar) sensors can be used in combination with trilateration or beamforming. Such solutions may however be associated with a number of challenges. For instance, reliable object localization typically requires each sensor to uniquely detect the same object. Due to multi-path fading this requirement may not always be trivially met in real-world environments. On the other hand, beam forming techniques may impose requirements on phase coherent signals within the receiver chain and also require several receiver antennas to get high spatial resolution without angle aliasing. This may increase the complexity of the object detection system and fitting the robot with a multi-antenna array may not always be practical.

SUMMARY OF THE INVENTION

In view of the above, it is an object to provide an autonomous moving object, such as a mobile cleaning robot or autonomous lawn mower, with a radar-based system mitigating, alleviating or eliminating one or more of the above-identified deficiencies in the art. According to a first aspect there is provided an autonomous moving object comprising:
  a radar sensor mounted on the autonomous moving object and configured to scan a volume in front of the object during a movement of the object along a movement path, and
  a radar signal processor configured to:
    acquire a sequence of radar responses, each radar response of the sequence being acquired at a different position of the autonomous moving object along the movement path, and
    perform synthetic aperture radar processing of at least parts of the acquired sequence of radar responses to obtain a synthetic aperture radar image representing response amplitude as a function of at least distance and angle with respect to the radar sensor,
the autonomous moving object further comprising:
  a controller configured to detect presence of a potential obstacle within a pre-defined sub-volume in front of the autonomous moving object by evaluating whether the synthetic aperture radar image comprises any amplitude peaks within a pre-defined set of distances and angles, and wherein the controller is configured to, in response to detecting presence of a potential obstacle, output a control command configured to cause a changed movement of the autonomous moving object.

According to the inventive aspect, an autonomous moving object may be provided with a radar-based system which may be easily fitted on the autonomous moving object and which enables reliable obstacle detection and obstacle avoidance. Especially, obstacle detection is enabled using a single radar sensor. Obstacle detection may accordingly be achieved by a compact and low-cost system which may fitted on the autonomous moving object in a simple manner.

Applying synthetic aperture radar on a sequence of radar responses acquired at different positions of the autonomous moving object along the movement path may provide spatially resolved data on the whereabouts of potential obstacles in vicinity of the autonomous moving object. The motion of the robot itself is used together with repeated radar measurements at regular (spatial) intervals to create a virtual array of radar antennas. The antenna aperture is thus synthetically extended. This extra "dimension" of signals allows reconstruction of objects in angular space from the movement direction of the sensor without having to rely on object identification, association and techniques such as trilateration. Therefore, object detection and navigation in complex environments may be obtained with high robustness.

The autonomous moving object may preferably have, at least temporarily, a known velocity measured in wavelengths/second. The disclosed autonomous moving object may allow detection of obstacles likely to be on a collision course with the moving object. Furthermore, the autonomous moving object may allow for detection of obstacles which are not likely to collide with the moving object. The autonomous moving object may separate said obstacles likely to collide and said obstacles not likely to collide since the two types of obstacles may be separated from each other by being associated with a respective non-overlapping range of spatial angles. This may be achieved using a single radar sensor and without using trilateration nor multi-antenna array beamforming techniques, and thus provides a less complex solution. Furthermore, the approach of combining coherent radar measurements may increase the signal-to-noise ratio of the acquired radar responses while the autonomous moving object is moving. This may provide a better accuracy and thus an improved detection. Such an improved detection may in turn allow for a more robust and accurate decision making preceding the output of the control command configured to cause the change of the autonomous moving object.

Furthermore, since the radar sensor scans a volume in front of the object, the obstacle detection is not limited to detection of objects within a same horizontal plane as the autonomous moving object. Indeed, detection of obstacles located also above the movement path of the autonomous moving object is possible based on the scanning by a single radar sensor. Hence, the radar sensor may allow detection of an obstacle in the form of an insufficient height clearance for the autonomous moving object. For instance, for a mobile cleaning robot an insufficient height clearance (i.e. a clearance less than a maximum height of the mobile cleaning robot) under a furniture such as a couch may be detected and accordingly avoided.

According to some embodiments, the synthetic aperture radar image is a two-dimensional image representing response amplitude as a function of distance and angle with respect to the radar sensor. This implies that the synthetic aperture radar image may be represented by a two-dimensional matrix allowing for spatially resolving a potential obstacle as function of distance to the potential obstacle, and an angle of a direction to the potential obstacle, said angle being defined with respect to a forward direction of the autonomous moving object. The embodiment may be advantageous as it may allow for simplified synthetic aperture radar processing as only one angle has to be inferred. As only one angle is inferred, elevation and azimuth of the potential obstacle may not be resolved. This may, however, be of less importance for some applications. For example, in case of an autonomous moving object moving on a planar, or near-planar, surface, such as e.g. a floor or a lawn, it may be of less importance whether or not the potential obstacle is located to the right, to the left, or above, the movement path of the autonomous moving object as an obstacle in any of these positions may require a changed movement of the autonomous moving object to avoid collision.

According to some embodiments, the synthetic aperture radar image is a three-dimensional image representing response amplitude as a function of distance, elevation and azimuth with respect to the radar sensor. This implies that the synthetic aperture radar image may be represented by a three-dimensional tensor (3D SAR volume) allowing for spatially resolving a potential obstacle as function of distance to the potential obstacle, and a pair of angles defining a direction to the potential obstacle, said pair of angles being defined with respect to a forward direction of the autonomous moving object. The pair of angles may comprise an azimuth angle defined in a horizontal plane, and an elevation angle defined in a vertical plane. Successfully inferring distance, elevation and azimuth by synthetic aperture radar processing may require the autonomous moving object to move along a curvilinear movement path.

The embodiment may be advantageous for some applications as it may allow for improved spatial resolution as compared to the two-dimensional embodiment.

The radar sensor of the autonomous moving object is preferably able to produce phase-coherent IQ data. The radar sensor may be configured to emit pulsed radar signals or wavelets. Alternatively, the radar sensor may be configured to emit continuous radar signals, such as e.g. frequency-modulated continuous wave signals. By pulse or wavelet is hereby meant an electro-magnetic oscillating signal having a carrier frequency and a limited temporal extension. Each pulse or wavelet may include one or more oscillations. It is understood that many alternative embodiments of the radar sensor and/or the synthetic aperture radar processing may be applicable within the scope of the claims.

According to some embodiments, presence of the potential obstacle is detected by evaluating whether the synthetic aperture radar image comprises any amplitude peaks exceeding a threshold amplitude. This may allow for reducing the susceptibility of noise affecting the result. Moreover, it allows adjusting a sensitivity of the processing algorithm so as to determine which responses are to be interpreted as objects and which radar responses are to be disregarded.

According to some embodiments, wherein the radar responses of the sequence are acquired at positions along the movement path separated by ¼ of a wavelength or less. Keeping the spatial resolution of the acquired radar responses along the movement path below or on ¼ of a wavelength, the spatial resolution of the synthetic aperture radar image is not compromised. The quarter of a wavelength will appear as important due to the movement of the radar sensor with respect to the target. Unlike a pure transmitting (TX) or pure receiving (RX) antenna array, where a common antenna spacing is 0.5λ, the combination of moving both TX and RX in a radar sensor will create the same effect at half the distance.

According to some embodiments, each radar response of the sequence comprises a data container of I/O samples, wherein each I/O sample pertains to a specific distance from the autonomous moving object.

This implies that a radar response may be represented by a vector of complex numbers, wherein each complex number of the vector representing a reading pertaining to a specific distance from the radar sensor.

According to some embodiments, the synthetic aperture radar image is obtained based on a discrete Fourier transform, or fast Fourier transform, of the sequence of radar responses.

According to some embodiments, the controller being configured to detect presence of a potential obstacle within a pre-defined sub-volume in front of the autonomous moving object by evaluating whether the synthetic aperture radar image comprises any amplitude peaks comprises iteratively:

finding a data point of maximum amplitude in the synthetic aperture radar image, applying a mask function to remaining data points of the synthetic aperture radar image,
wherein the mask function has a maximum value being located at a position of the found data point and being at least equal to the found maximum amplitude, and wherein values of the mask function are lower than said maximum value at least for data points being distanced from the found data point of maximum amplitude by more than a threshold distance,
wherein the mask function is applied by nulling or invalidating remaining data points which have values below said mask function so as to obtain a processed image, and repeating the above on said processed image, and, later, on subsequently obtained processed images, until all amplitude peaks are found, and said controller being configured to evaluate if any of the above found amplitude peaks are within the pre-defined set of distances and angles.

An advantage of the above algorithm may be that it can be used to suppress neighboring points which are of high amplitude due to the same radar reflection to find a single peak for each strong radar reflection. Also, strong radar reflections sometimes give rise to leakage in the synthetic aperture radar image due to timing inaccuracies and other signal aspects; this iterative masking may remove also such effects. The disclosed iterative approach may be advantageous as it allows for detecting presence of a potential obstacle in an efficient way. The algorithm requires relatively low CPU load, and may provide accurate output for a range of situations.

In case the synthetic aperture radar image is a two-dimensional image representing response amplitude as a function of distance and angle with respect to the radar sensor, the mask function may be a two-dimensional function. In case the synthetic aperture radar image is a three-dimensional image representing response amplitude as a function of distance, elevation and azimuth with respect to the radar sensor, the mask function may be a three-dimensional function.

The mask function may be a monotonically decreasing function. The mask function may be a continuous function. The mask function may be a Gaussian function or a Lorentzian function. The mask function may, alternatively, be a discrete function, such as a binary function. In case the mask function is a discrete function, the maximum value thereof may encompass an area (2D case), or volume (3D case) of the mask function at the position of the found data point. In other words, a plurality of data points may have the maximum value. Said plurality of data points having the maximum value may define a coherent region of the mask function encompassing the position of the found peak amplitude in the synthetic aperture radar image. In case the mask function is a binary function, the mask function may have a minimum value for data points being distanced from the found data point of maximum amplitude by more than a threshold distance, and the maximum value in remaining data points. For some embodiments, the mask function decreases as a function of increasing distance from the position of the found data point. The decrease may be covering the entire mask function, or portions thereof. According to some embodiments, for at least said data points being distanced from the found data point of maximum amplitude by more than a threshold distance: the mask function decreases as a function of increasing distance from the position of the found data point. This implies that the mask function may have any appearance within the region defined by data points being distanced from the found data point of maximum amplitude by less than the threshold distance, as long as the mask function has its maximum value located at the position of the found data point and being at least equal to the found maximum amplitude. As appreciated by a person skilled in the art, the mask function may have different spatial coverage dependent on the specific embodiment. For example, in the case of a continuous function, if leakage in the synthetic aperture radar image due to timing inaccuracies and other signal aspects is relatively large, a mask function having a wider full width at half maximum may be required. As leakage may affect different parts of the synthetic aperture radar image to different degree, it is conceivable to adjust the mask function dependent on the position of a found data point of maximum amplitude.

In the embodiment disclosed hereinabove, the mask function is applied to remaining data points of the synthetic aperture radar image. However, in an alternative embodiment, the mask function is applied to all data points of the synthetic aperture radar image. This implies that the mask function is applied also for the found data point of maximum amplitude. As said found data point will be equal to, or smaller, than the mask function, this will result in a processed image where also the found data point has been nulled or invalidated. In such a case, the position of the found maximum amplitude may be stored elsewhere for later retrieval.

According to some embodiments, the synthetic aperture radar image is obtained from synthetic aperture radar processing performed on a subset of the acquired sequence of radar responses, wherein the radar signal processor is further configured to perform synthetic aperture radar processing of one or more further subsets of the acquired sequence of radar responses to obtain one or more further synthetic aperture radar images each representing response amplitude as a function of distance and angle with respect to the radar sensor, wherein said subset and each of said one or more further subsets being time-shifted with respect to each other.

According to some embodiments, the controller being configured to detect the presence of a potential obstacle comprises: the controller being configured to evaluate whether amplitude peaks of said synthetic aperture radar image and amplitude peaks of said one or more further synthetic aperture radar images correspond to overlapping spatial regions within the scanned volume.

By performing synthetic aperture radar processing on more than one subset of radar responses of the sequence, and using more than one synthetic aperture radar image as input for detecting the presence of the potential obstacle, accuracy of predictions will be further improved. This implies that the subset and the one or more further subsets of the sequence of radar responses are different from each other. However, it is conceivable that the subset and the one or more further subsets of the sequence of radar responses share common radar responses.

According to some embodiments, the controller being configured to detect the presence of a potential obstacle further comprises: the controller being configured to track a potential moving obstacle by estimating a position and a velocity thereof, wherein said estimation comprises comparing said amplitude peaks of the synthetic aperture radar image and amplitude peaks of the one or more further synthetic aperture radar images to determine if there are any amplitude peaks associated with a moving obstacle, and, if there are any amplitude peaks associated with a moving obstacle: the controller being further configured to evaluate if the potential moving obstacle is on a collision course with the autonomous moving object.

This may be adventurous is some applications as the autonomous moving object may detect and account for also moving objects. One example where this may be of importance, is applications where more than one autonomous moving object is operated simultaneously within a same region. This may be e.g. warehouse robots used within logistics.

According to some embodiments, the radar sensor is a first radar sensor and the radar signal processor is a first radar signal processor, and wherein said first radar signal processor is configured to acquire a first sequence of radar responses so as to obtain a first synthetic aperture radar image, the autonomous moving object further comprising:

a second radar sensor and a second radar signal processor, said second radar signal processor being configured to acquire a second sequence of radar responses, and perform synthetic aperture radar processing of the acquired second sequence of radar responses to obtain a second two-dimensional synthetic aperture radar image representing response amplitude as a function of distance and angle with respect to the second radar sensor, wherein the first radar sensor and the second radar sensor are configured to scan at least partly non-overlapping volumes in front of the object, and wherein the controller being configured to detect presence of the potential obstacle within the pre-defined sub volume by evaluating whether the first synthetic aperture radar image and/or the second synthetic aperture radar image comprise any amplitude peaks within a respective pre-defined set of distances and angles.

This may be an advantage as it allows for further improving the spatial resolution of obstacle detection. Using one sensor, the autonomous moving object may not know on which side a specific obstacle is detected, as the determined angle may be defined either from the left or from the right with respect to the movement path. By using two sensors, covering overlapping volumes, the location of a specific obstacle within the overlapping volume may be determined by comparing the first and second synthetic aperture radar image. Alternatively, if the specific obstacle is present within a non-overlapping volume, one of the radar sensors may detect the obstacle whereas the other radar sensor may not. This may also allow determining the spatial location of the obstacle. Furthermore, using two radar sensors may allow extending the scanned volume in front of the object, hence increasing the effective range of detection.

According to some embodiments, the controller being configured to detect presence of the potential obstacle within the pre-defined sub volume by evaluating whether the first synthetic aperture radar image or the second synthetic aperture radar image comprise any amplitude peaks within the respective pre-defined set of distances and angles. This may be advantageous as it may allow faster detecting presence of a potential obstacle. By allowing the radar sensor that first detects the obstacle to trigger a change of movement, latency time may be reduced.

The autonomous moving object may be for example a household robot. According to some embodiments, the autonomous moving object is one or more from the list of: robotic vacuum cleaner, robotic lawn mower, warehouse robots.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The invention will by way of example be described in more detail with reference to the appended drawings, which shows presently preferred embodiments of the invention.

DETAILED DESCRIPTION OF THE PREFERRED EMBODIMENT

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
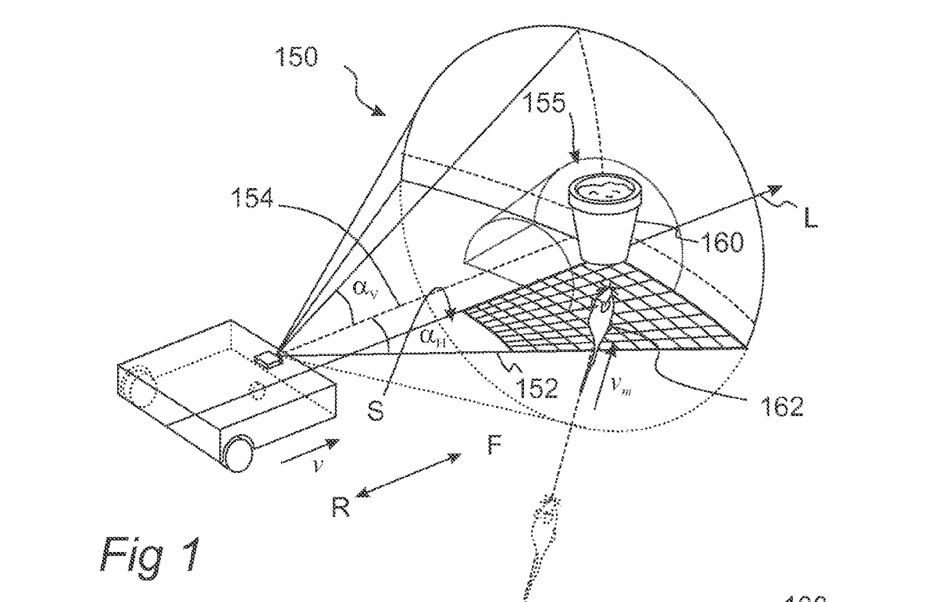
FIG. 1 is a perspective view of an autonomous moving object according to an embodiment.
Figure 2:
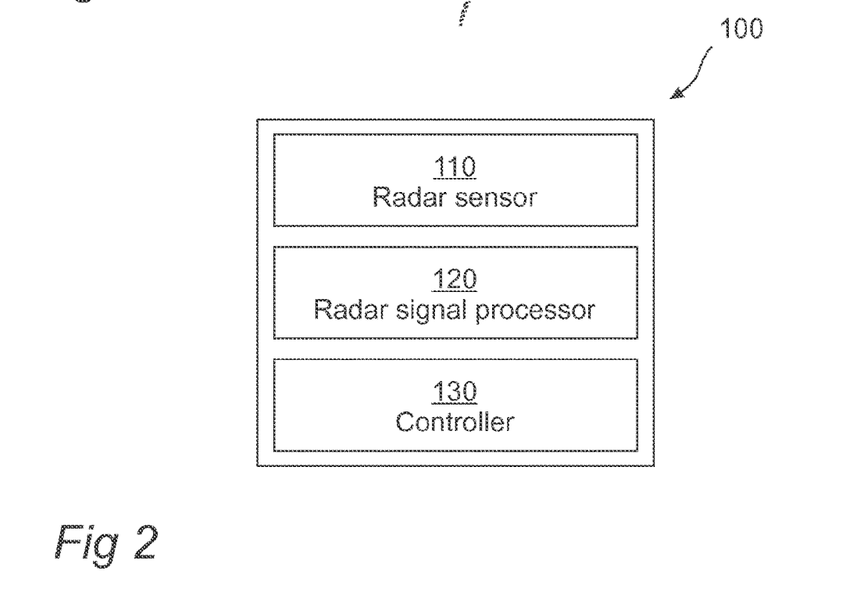
FIG. 2 is a schematic view of the autonomous moving object of FIG. 1.

FIGS. 1 and 2 shows an autonomous moving object 100 according to an example embodiment. The autonomous moving object 100 is configured to be movable over a surface S. The autonomous moving object 100 may be e.g. a robotic vacuum cleaner, or a robotic lawn mower. Other types of autonomous moving objects are however also possible. The autonomous moving object 100 may also be an autonomous vehicle, such as a self-driving car. The autonomous moving object may also be an unmanned aerial vehicle, for instance a delivery drone for transporting goods.

The autonomous moving object 100 comprises a body, the periphery of which is schematically indicated in FIG. 1. It should be noted that the peripheral shape schematically indicated in FIG. 1 is merely one example and other shapes are also possible. For instance, the body of the autonomous moving object 100 may be rounded. The autonomous moving object 100 comprises a drive sub-system (not shown) configured to maneuver the autonomous moving object 100 along the surface S. The drive sub-system may include a wheeled drive sub-system including a number of wheel modules disposed underneath the autonomous moving object 100 in such a manner that the cleaning autonomous moving object 100 may move along the surface S in a forward direction F and a rearward direction R, as indicated in FIG. 1. The drive sub-system may further be configured to allow the autonomous moving object 100 to change its direction, for instance by rotating in a clockwise and counterclockwise direction around a vertical axis extending through a substantially central portion of the body of the autonomous moving object 100. In case the autonomous moving object is a non-ground based moving object, the drive sub-system may instead be configured to maneuver the autonomous moving object 100 along a movement path through the air, for instance by means or propellers or the like.

The autonomous moving object 100 may further comprise means for performing a specific task. For example, if the autonomous moving object 100 is a cleaning robot, the autonomous moving object 100 further comprises cleaning means. Similarly, if the autonomous moving object 100 is a robotic lawn mower, the autonomous moving object 100 further comprises grass cutting means, and so on.

The autonomous moving object 100 further comprises a radar sensor 110 mounted on the autonomous moving object and configured to scan a volume 150 in front of the object during a movement of the object 100 along a movement path L. The volume 150 may be directed substantially in the forward direction F. It should be noted that the forward direction generally should be construed as the direction in which the autonomous moving object 100 moves. I.e. a rearward looking radar sensor 110 may during a reverse movement be considered to scan a volume 150 in front of the object, thereby enabling detection of obstacles along the movement path of the reverse movement. As a non-limiting example this may be put to use as a parking sensor or proximity sensor for an autonomous vehicle. A radar sensor 110 may for instance be arranged at the rear bumper of a self-driving car.

With reference to FIG. 1, the radar sensor 110 is configured to transmit radar signals in the forward direction F so as to cover a volume 150 in front of the object 100. The radar sensor 110 may be configured to transmit pulsed radar signals such as e.g. wavelets. The radar sensor 110 may include a transmitter configured to transmit (pulsed) radar signals. By pulse or wavelet is hereby meant an electromagnetic oscillating signal having a carrier frequency and a limited temporal extension. Each pulse or wavelet may include one or more oscillations. It is also conceivable to use other kinds of radars with spatially well-defined measurement points, e.g. short FMCW pulses. The radar sensor 110 is further configured to acquire a radar response from surfaces and/or obstacles present within the volume 150. A radar response may include a reflected radar signal (e.g. a reflected radar pulse or wavelet). The radar sensor 110 may include a receiver configured to receive radar signals. The radar sensor 110 may include a transmitting antenna. The radar transmitter may be configured to transmit the radar pulses via the transmitting antenna. The radar sensor 110 may include a receiving antenna. The radar receiver may be configured to receive the reflected radar pulses via the receiving antenna. Alternatively, the radar sensor 110 may include a single antenna configured for both transmission and reception of signals. The antenna(s) may be of a directional type, for instance a dipole antenna, a Yagi antenna or a phased array antenna. Optionally, a lens or a reflector such as a horn reflector may be arranged in connection with the radar sensor to improve the directionality of the radar sensor. Radar signals in the form of pulsed radar signals may be generated using various techniques.

According to one example the radar sensor may include a transceiver module operating as a transmitter, as described in connection with FIG. 4 of the published PCT-application PCT/EP2011/058847 on page 11 lines 22-30. The transceiver module comprises: a tank circuit, a variable differential conductance (VDC), preferably in the form of a resonant tunneling diode (RTD), coupled to the tank circuit, and a variable resistance coupled to the VDC and arranged to bias the VDC into a region of positive differential conductance during a first state of operation of the transceiver, and bias the VDC into a region of negative differential conductance during a second state of operation of the transceiver. During the transceivers first state of operation no output signal is generated and during the second state of operation a sinusoidal radio frequency signal is generated. Thus, by switching the transceiver from the first state to the second state and back to first state again, a pulse or wavelet signal may be generated where the duration of the wavelet corresponds to the time the transceiver is in its second state of operation. Compared with other methods of wavelet generation, this implementation offers a low-complexity method for generating wavelets with a well-defined start position and duration and a coherent phase content within the wavelet which enables a phase dependent system implementation and low power consumption due to the pulsed operation. This particular implementation may enable generation of wavelets of a duration between 10 ns and 50 ps in the mm-wave band, which gives a theoretical range resolution of 1.5 m to 7.5 mm, respectively. The wavelet generator described above may however also be implemented by using other oscillator configurations, for example, relying on negative differential conductance (e.g. provided by a cross-coupled differential pair) or positive feedback, where it is possible to start and quench the oscillations rapidly. Alternative implementations of wavelet generators include passing a continuous oscillation through a switchable amplifier, filtering of a baseband pulse, up-conversion of a baseband pulse, or using digital gates to create the desired waveform, as per se is known to the person skilled in the art.

The radar sensor 110 may be configured to acquire radar responses resulting from transmitted radar signals. Analog or digital representations of acquired radar responses may be output to a radar signal processor 120 for further processing, as will be described in more detail below. The autonomous moving object 100 may for instance include a communication interface, such as a data bus, via which the radar sensor 110 may communicate data to the radar signal processor 120.

Radar responses may be acquired using various techniques. A transmitted radar pulse may result in a reflected radar pulse from surfaces and/or obstacles present within the volume 150. Reflected radar pulses may be acquired by directly sampling and digitizing each received radar pulse. Alternatively, to put less demands on the speed and accuracy of the acquisition and sampling circuitry, the radar sensor 110 may include a sliding-correlator type of receiver enabling time-diluted sampling of reflected radar pulses. A burst of pulsed radar signal may be transmitted by the radar sensor 110, and a reflected corresponding signal burst may be received by the radar sensor 110. Each received reflected radar signal of the burst may be mixed with a respective pulsed reference signal generated by the radar sensor at a predetermined delay with respect to the transmitted radar pulse of the burst giving rise to the reflected radar pulse, which delay is varied throughout the burst. The mixing products may be processed and combined to determine or reconstruct an approximation of a received signal. The radar signal processor 120 may then further process each reconstructed received signal as set out below. A specific example of a wavelet transmitter/receiver system having a "sliding-correlator functionality" is disclosed on page 15 line 14 to page 25 line 23 in the published PCT-application PCT/EP2015/054678 in connection with FIGS. 1 and 2 thereof. An example operation of the system including mixing of received and reference signals is given on page 33 lines 13-34 with reference to FIGS. 6 and 7 of PCT/EP2015/054678. It should however be noted that also other implementations allowing coherent generation of transmitted and reference signals with a controllable phase relationship and correlation of received signals with the reference signals are possible.

As illustrated in FIGS. 1, the radar sensor 110 is configured scan a volume 150 extending over a portion 152 of the surface S in front of the autonomous moving object 100. FIG. 1 shows the portion of the scanned volume corresponding to the half power beam width (HPBW). A horizontal azimuthal angle $\alpha_H$ of the scanned volume 150 may be defined as the angle between the axes along which the scanned volume 150 presents the HPBW. With reference to FIG. 1, a vertical elevation angle $\alpha_V$ of the volume 150 may be defined as the angle between the axes along which the volume 150 presents the HPBW. The horizontal azimuthal angle $\alpha_H$ may for instance be in the range of 30-100 degrees, such as about 50 degrees. The vertical elevation angle $\alpha_V$ may for instance be in the range of 30-100 degrees, such as about 80 degrees. A principal axis 154 may extend substantially parallel with the surface S. However, it is also conceivable that the principal axis 154 forms an angle with respect to the surface S.

As previously mentioned, the cleaning robot 100 comprises a radar signal processor 120. The radar signal processor 120 is configured to extract features or characteristics of radar responses. Although indicated as being separated from the radar sensor 110, it is conceivable that the radar signal processor 120 be co-located. The radar signal processor 120 may extract one or more of an amplitude of a radar response, a phase of a radar response, a spectral content of a radar response or a delay of a radar response. The radar signal processor 120 may be configured to output an indication of the extracted features. The indication may include information regarding the extracted feature(s). The radar signal processor 120 may for instance output the indication as data representing the extracted feature(s) (e.g. data representing the amplitude, phase, spectral content and/or delay). The radar signal processor 120 may output the data to a controller 130 which, in response, may control the autonomous moving object 100 as will be further described below. The radar signal processor 120 may communicate with the controller 130 via a communication interface, such as the aforementioned data bus. The processing of the radar signal processor 120 may be implemented in dedicated circuitry, or in an application-specific integrated circuit (ASICs) or field-programmable gate arrays (FPGAs). The radar signal processor 120 may also include a microprocessor and a computer readable medium, such as a nonvolatile memory, storing instructions implementing the processing operations of the radar signal processor 120. The controller 130 of the autonomous moving object 100 is configured to control an operation of the autonomous moving object 100, based on features of acquired radar responses, extracted by the radar signal processor 120. The controller 130 may output a control command to the appropriate sub-system of the autonomous moving object 100. The controller 130 may output a control command to the drive sub system of the autonomous moving object 100 in case the movement of the autonomous moving object 100 is to be controlled. The controller 130 may communicate with the relevant subsystem via a communication interface, such as the aforementioned data bus. The controller 130 may similar to the radar signal processor 120 be implemented in dedicated circuitry, an ASIC, an FPGAs or by a microprocessor and a computer readable medium storing instructions implementing the operations of the controller 130.

Although indicated as a being separated from the radar signal processor 120, the radar signal processor 120 and the controller 130 may be co-located and represent different functional units implemented in different portions of a common circuit and/or by different software instructions being executed by a same microprocessor.

Figure 3:
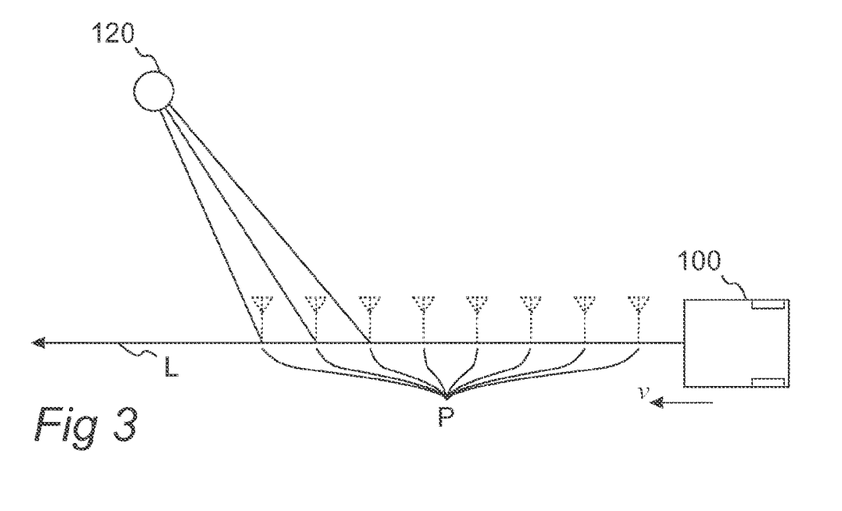
FIG. 3 is a top view of the autonomous moving object of FIG. 1.

The operation of the autonomous moving object 100 will now be described with reference to FIGS. 1 and 3.

The autonomous moving object 100 is driving in the forward direction F along the surface S. The surface S may be a floor surface of any typical material, for instance wood, plastic, concrete or tiles. Alternatively, the surface S may be a lawn. A potential obstacle 160 is present within the scanned volume 150. As can be seen in FIG. 1, the potential obstacle of the example is a flower pot 160. Also shown in FIG. 1, is a moving obstacle 162 (a toy mouse) which enters the volume 150 from the side at a velocity $v_m$. The moving obstacle detection will be further discussed later.

During the forward movement, the radar sensor 110 repeatedly transmits radar signals in the forward direction F as described earlier. The radar sensor 110 may be configured to transmit radar signals at a repetition frequency in the range of 10 Hz to 100 MHz, by way of example. The radar sensor 110 acquires radar responses from the surface (e.g. by receiving and sampling radar signals reflected by surfaces and/or potential obstacles using any of the afore-mentioned techniques). Over time, the radar sensor 110 accordingly acquires a sequence 170 of radar responses. Put in other words, the radar signal processor 120 is configured to acquire the sequence 170 of radar responses. Each radar response of the sequence 170 is, as shown in FIG. 3, acquired at a different position P of the autonomous moving object 100 along the movement path L. At each position P, a virtual antenna will be effectively created. As appreciated by the person skilled in the art of synthetic aperture radar, this creates a synthetic aperture of the radar sensor 110 considerably larger than the physical aperture thereof.

Figure 4:
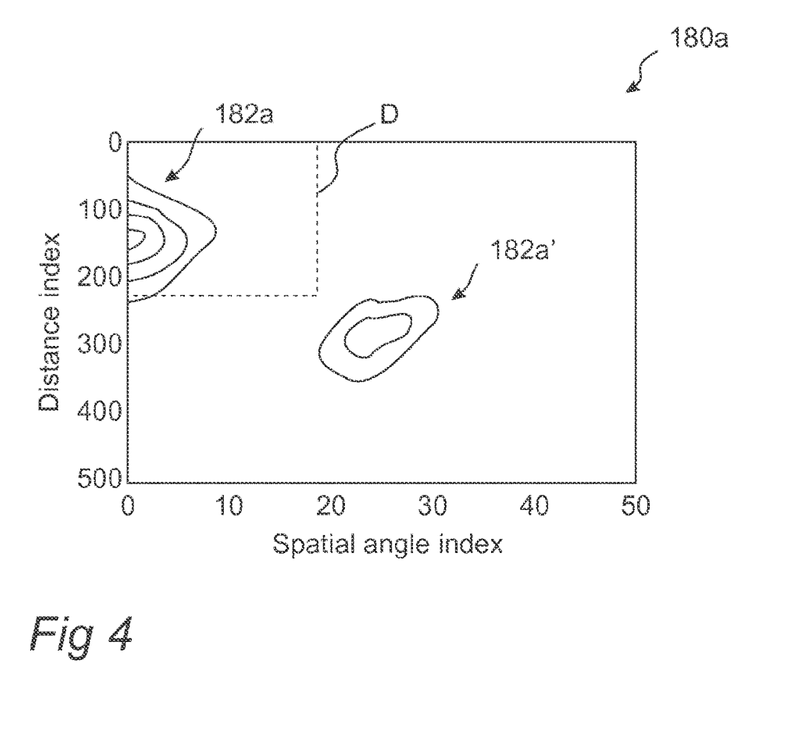
FIG. 4 shows a synthetic aperture radar image according to an embodiment.

The radar signal processor 120 is further configured to perform synthetic aperture radar processing of at least parts of the acquired sequence 170 of radar responses to obtain a synthetic aperture radar image 180*a*. Said synthetic aperture radar image 180*a* represents response amplitude as a function of at least distance and angle with respect to the radar sensor 110. The synthetic aperture radar image 180*a* of the example is a two-dimensional image representing response amplitude as a function of distance and angle with respect to the radar sensor 110. The synthetic aperture radar image 180*a* of the example is illustrated in FIG. 4. The synthetic aperture radar image 180*a* comprises two areas of signal, i.e. amplitude peaks, i.e. the amplitude peak 182*a* (corresponding to the flower pot 160) and 182*a'* (corresponding to the toy mouse 162).

It is noted here that the synthetic aperture radar image 180*a* of the example does not resolve the angle along the horizontal and vertical dimension as defined in respect to the autonomous moving object 100. In other words, the synthetic aperture radar image 180*a* does not separately resolve the azimuth angle $\alpha_T$ and the elevation angle $\alpha_V$. In alternative embodiments of the autonomous moving object, the synthetic aperture radar image may be a three-dimensional image representing response amplitude as a function of distance, elevation and azimuth with respect to the radar sensor. Such an embodiment may require the autonomous moving object 100 to move along a curvilinear movement path.

Turning back to the example, it will now be described an algorithm for synthetic aperture radar processing to provide a two-dimensional synthetic aperture radar image.

Let $x_k(d)$ be a vector of complex I/O samples from a radar scan. d is here a depth distance index from the sensor (measured as a delay from TX to RX), and k is a radar sweep index, where the spatial distance between the different positions P (as realized by robot motion) between any two scans is $0.25\lambda$. Each radar response of the sequence 170 will thus comprise a data container of I/O samples, wherein each I/O sample pertains to a specific distance d from the autonomous moving object 100. The acquired radar responses of the sequence 170 are acquired at positions P along the movement path L separated by ¼ of a wavelength or less.

At least K radar scans are acquired by moving the robot forward between the positions P and performing a radar scan every $0.25\lambda$. As a result from the K radar scans, the sequence 170 of radar responses will be obtained. Then, a set of one-dimensional length-K discrete Fourier Transforms (DFT) are applied over the spatial dimension for every depth index d and spatial angle index a to form the synthetic aperture radar image 180*a*, $X_k(d, a)$ according to:

$$X_k(d, a) = \frac{1}{\sqrt{K}} \sum_{n=0}^{K} x_{k+n}(d) e^{-i2\pi\left(a-\frac{K}{2}\right)n/K}$$

The synthetic aperture radar image 180*a* is thus obtained based on a discrete Fourier transform of the sequence 170 of radar responses. Alternatively, a Fast Fourier transform (FFT) may be used. The spatial angle index a can, if desired, be translated into an actual spatial angle θ by the relation $$\theta(a) = a\cos\left(\frac{2a}{K} - 1\right)$$

The autonomous moving object 100 further comprises a controller 130 configured to detect presence of a potential obstacle 160 within a pre-defined sub-volume 155 in front of the autonomous moving object 100 by evaluating whether the synthetic aperture radar image 180*a* comprises any amplitude peaks 182*a*, 182*a*' within a pre-defined set D of distances and angles (See FIG. 4). Thus, the algorithm checks whether amplitude peaks are present within a specific range of indices defined as (d,a)∈ D.

The presence of amplitude peaks within the synthetic aperture radar image 180*a* may be carried out in many alternative ways. As appreciated by the person skilled in the art, the synthetic aperture radar image 180*a* will, as a result from the processing as well as underlying sensor data, include noise and/or other unwanted image artifacts not associated with a potential obstacle. A relatively straightforward approach of discerning the amplitude peaks from such unwanted artifacts/noise is to apply a sensitivity threshold. Thus, the presence of the potential obstacle 160 may be detected by evaluating whether the synthetic aperture radar image 180*a* comprises any amplitude peaks 182*a*, 182*a*' exceeding a threshold amplitude. In other words, the criterion for detecting the presence of amplitude peaks may be ∃(d,a)∈ D s.t. |$X_k(d,a)$|²≥T.

Figures 5A, 5B:
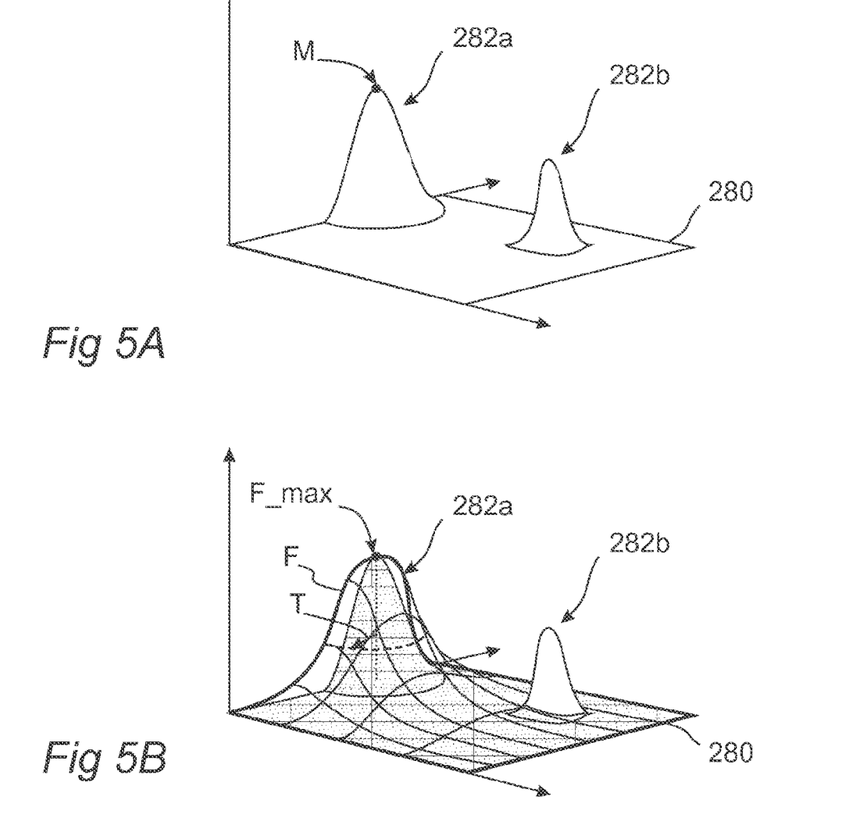
FIG. 5A-C shows an evaluation whether a synthetic aperture radar image comprises any amplitude peaks according to an embodiment.
Figure 5C:
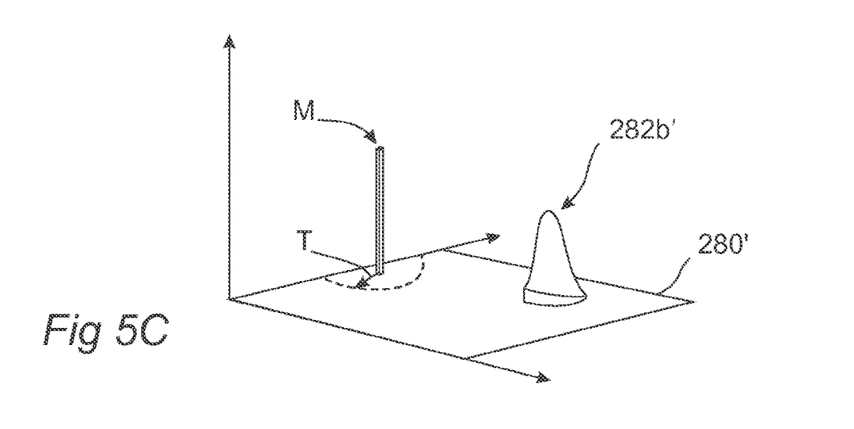

An alternative approach of detecting the presence of amplitude peaks is disclosed with reference to FIG. 5A-C, illustrating the synthetic aperture radar image 280 according to another example. The synthetic aperture radar image 280 comprises a first 282*a* and second 282*b* signal area pertaining to obstacles detected by the radar sensor 110.

First, a data point M of maximum amplitude in the synthetic aperture radar image 280 is found, as illustrated in FIG. 5A, where the point M of maximum amplitude is found within the first signal area 282*a*.

Then, as illustrated in FIG. 5B, a mask function F is applied to remaining data points of the synthetic aperture radar image 280. Values of the mask function F is lower than said maximum value F_max at least for data points being distanced from the found data point M of maximum amplitude by more than a threshold distance T. Specifically, for the embodiment of the mask function F of FIG. 5B, the mask function F is lower than said maximum value F_max also for data points being distanced from the found data point M of maximum amplitude by less than the threshold distance T. FIG. 5 further shows that the mask function F decreases as a function of increasing distance from the position of the found data point M. In alternative embodiments of the mask function, said decrease is only covering portions of the mask function. For example, the mask function F may decrease as a function of distance from the position of the found data point M for the data points being distanced from the found data point M of maximum amplitude by more than the threshold distance T.

The maximum value F_max is located at a position of the found data point M. Furthermore, the maximum value F_max is at least equal to the found maximum amplitude in the synthetic aperture radar image 280. The mask function of the example may be e.g. a Gaussian function or a Voight function. As can be seen in FIG. 5B, the mask function F covers the first signal area 282*a* completely, i.e. all data points of the first signal area 282*a* will have values less than, or equal to, the values of the mask function F. However, further away from the first signal area 282*a*, the mask function F has decreased to quite some degree. Specifically, at the second signal area 282*b*, values of the mask function F are considerably lower than data points of the synthetic aperture radar image 280.

Then, as illustrated in FIG. 5C, in applying the mask function F to the synthetic aperture radar image 280, remaining data points which have values below said mask function F are nulled or invalidated so as to obtain a processed image 280'. As can be seen in FIG. 5C, this leaves two areas with signal: The found data point M of maximum amplitude, and a subset of the data points of the second signal area 282*b*.

The above steps are then repeated on said processed image 280', in order to find the position of the amplitude peak of the second signal area 282*b* (not shown). In a general case, where the image comprises more than two signal areas, the above steps are repeated on subsequently obtained processed images. The steps are repeated until all peaks are found.

Once the amplitude peaks of the synthetic aperture radar image 180*a*, 280, said controller 130 is configured to evaluate if any of the found amplitude peaks are within the pre-defined set D of distances and angles, thus marking an end of the presence detection.

The controller 130 is then further configured to, in response to detecting said presence of the potential obstacle 160, output a control command configured to cause a changed movement of the autonomous moving object 100. The control command may be transmitted to the drive sub-system of the autonomous moving object 100. The controller 130 may apply further algorithms not specifically disclosed herein for transmitting a command suitable for the situation at hand. For example, it a potential obstacle is detected in front of the autonomous moving object 100, but slightly offset to the left, the controller 130 may transmit a command to the drive sub-system instructing the drive sub-system to turn slightly to the right, so as to proceed in a slightly adjusted direction. If, alternatively, potential obstacles are detected in front of the autonomous moving object 100, offset slightly to the right and to the left, respectively, the controller 130 may transmit a command to the drive sub-system instructing the drive sub-system to turn 180 degrees and thus proceed along a drastically different direction.

Figure 6:
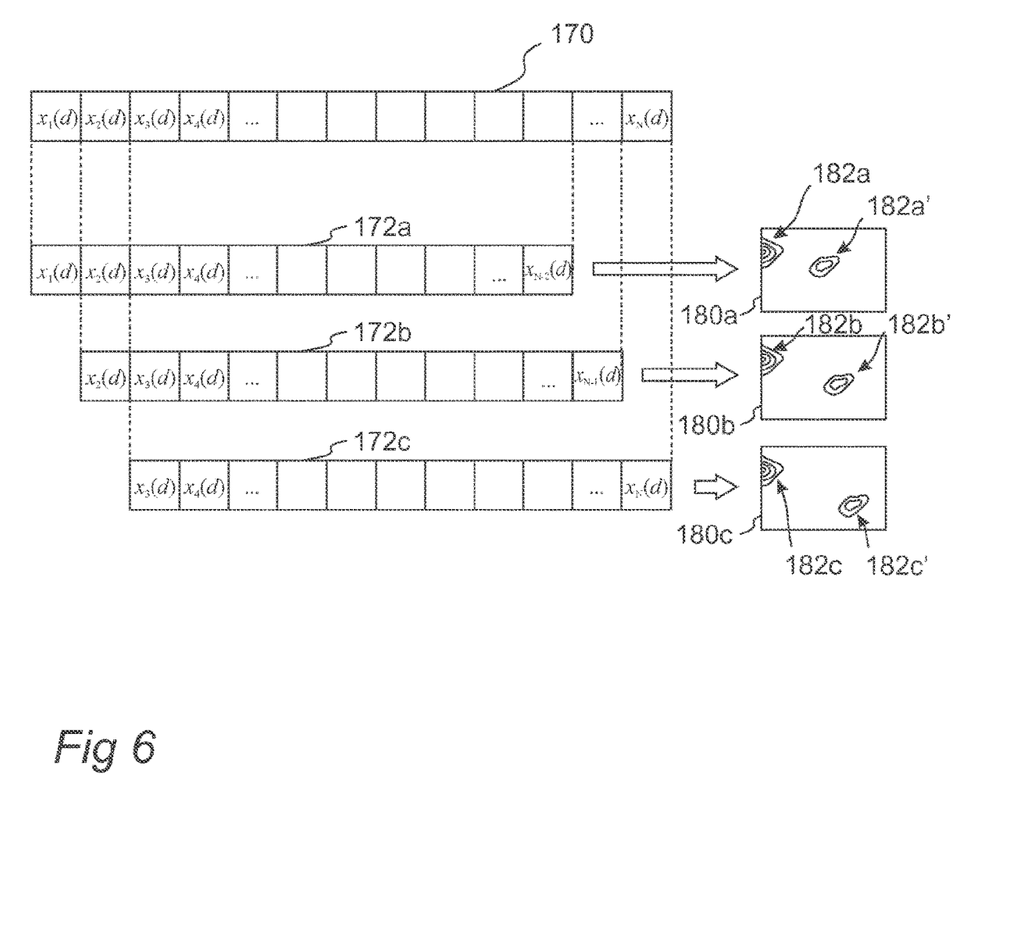
FIG. 6 is a schematic view of synthetic aperture radar images obtained from different subsets of a sequence of radar responses according to an embodiment.

In the example described with reference to FIG. 1-4, the synthetic aperture radar image 180*a* was obtained by processing at least parts of the acquired sequence 170 of radar responses. However, it is also possible to derive further synthetic aperture radar images by using a different set of radar responses as input. This will be described with reference to FIG. 6, which illustrates the sequence 170 of acquired radar responses (comprising in total N radar responses). In the example, the synthetic aperture radar image 180*a* is obtained from synthetic aperture radar processing performed on a subset 172*a* of the acquired sequence 170 of radar responses. Then, the radar signal processor 120 is further configured to perform synthetic aperture radar processing of one or more further subsets 172*b*, 172*c* of the acquired sequence 170 of radar responses to obtain one or more further synthetic aperture radar images 180*b*, 180*c* each representing response amplitude as a function of distance and angle with respect to the radar sensor 110. As can be seen in FIG. 6, said subset 172*a* and each of said one or more further subsets 172*b*, 172*c* are time-shifted with respect to each other. In the example, the time shift corresponds to one radar response only, which implies that a majority of the acquired radar responses are common to the subsets 172*a-c*. However, other ways of defining the subsets are conceivable.

In the example, the controller 130 is configured to detect the presence of a potential obstacle 160 by evaluating whether amplitude peaks of said synthetic aperture radar image 180*a* and amplitude peaks of said one or more further synthetic aperture radar images 180*b*, 180*c* correspond to overlapping spatial regions within the scanned volume 150. Thus, more than one synthetic aperture radar image is derived using the synthetic aperture data processing algorithm, whereby an evaluation is performed on all of the derived images, thus reducing the risk of misreading.

As illustrated in FIG. 6, the synthetic aperture radar images 180*a-c* are not the same. The amplitude peaks 182*a*, 182*b* and 182*c* appears at a similar spatial location for the three images 180*a-c*, and thus appear to disclose a centrally located stationary obstacle (which we know is the flower pot 160). However, the amplitude peaks 182*a'*, 182*b'* and 182*c'* appear at different spatial locations, thus indicating a potential moving obstacle (which we know is the toy mouse 162).

In the example, the controller 130 is configured to track the potential moving obstacle 162 by estimating a position and a velocity thereof. Said estimation comprises comparing said amplitude peaks of the synthetic aperture radar image 180*a* and amplitude peaks of the one or more further synthetic aperture radar images 180*b*, 180*c* to determine if there are any amplitude peaks associated with a moving obstacle. If there are any amplitude peaks associated with a moving obstacle: the controller 130 is further configured to evaluate if the potential moving obstacle 162 is on a collision course with the autonomous moving object. The last step may be achieved using image analysis tools readily available to the skilled person. For example, the evaluation may be performed based on the use of a Kalman filter acting as a time filter to combining measurements (observations) and a model of the dynamics of the detected obstacles. The Kalman filter may be used to combine a set of measurements over time to create the most likely positions or trajectories of the obstacles.

Figure 7:
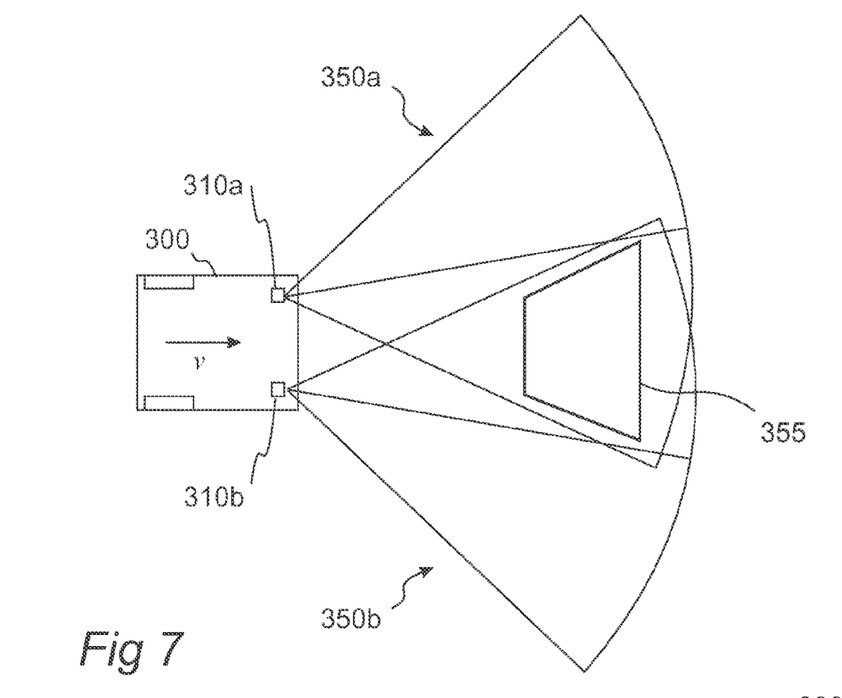
FIG. 7 is a top view of an autonomous moving object comprising two radar sensors according to an alternative embodiment.
Figure 8:
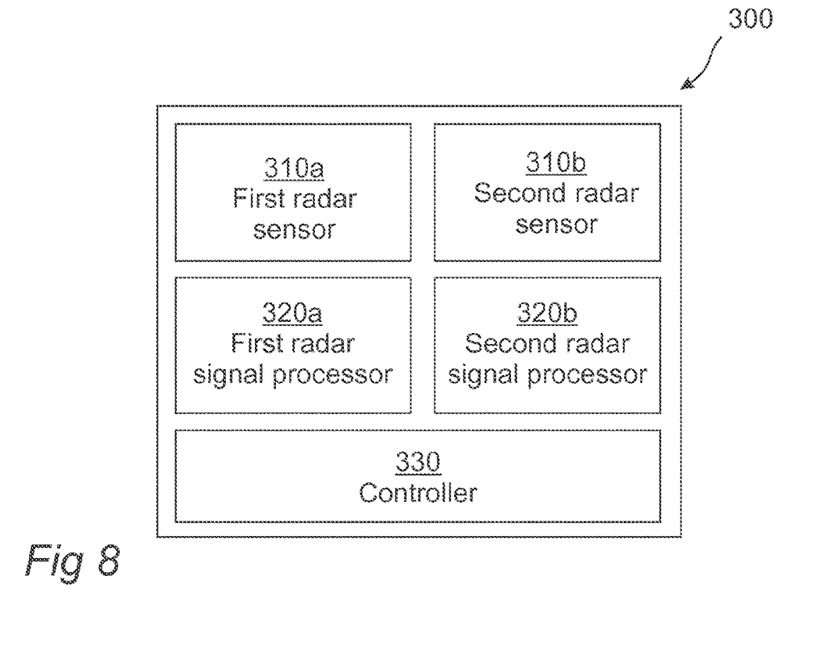
FIG. 8 is a schematic view of the autonomous moving object of FIG. 7.

Turning now to FIGS. 7 and 8, an autonomous moving object 300 according to another example embodiment will be described. The autonomous moving object 300 shares many aspects with the autonomous moving object 100 just described. The difference is that the autonomous moving object 300 comprises dual radar sensing means.

The autonomous moving object 300 comprises a first radar sensor 310*a* and a second radar sensor 310*b*. As illustrated in FIG. 7, the first 310*a* and second 310*b* radar sensors are disposed on opposite sides of a front portion of the autonomous moving object 300 and directed somewhat differently so as to provide a wider total scanned volume as compared to the autonomous moving object 100 shown in FIG. 1. Specifically, the first radar sensor 310*a* and the second radar sensor 310*b* are configured to scan at least partly non-overlapping volumes 350*a*, 350*b* in front of the object 300.

The autonomous moving object 300 further comprises and a first radar signal processor 320*a* and a second radar signal processor 320*b*. The first radar signal processor 320*a* is configured to acquire a first sequence 170*a* of radar responses so as to obtain a first synthetic aperture radar image 380*a*, and the second radar signal processor 310*b* is configured to acquire a second sequence 370*b* of radar responses so as to obtain a second synthetic aperture radar image 380*b*.

Thus, it is understood that the autonomous moving object 300 comprises two individual sets of radar sensor and radar signal processor. It is however, conceivable that the first radar signal processor 310*a* and the second radar signal processor 310*b* are implemented as a single processor, that the first radar signal processor 310*a* and the second radar signal processor 310*b* are co-located. In such a case, the autonomous moving object would only comprise one physical radar signal processor.

The controller 330 is configured to detect presence of the potential obstacle 160 within the pre-defined sub volume 355 by evaluating whether the first synthetic aperture radar image 380*a* and/or the second synthetic aperture radar image 380*b* comprise any amplitude peaks within a pre-defined set of distances and angles. The presence detection may be carried out using one of the previously described methodologies.

The controller 330 may utilize the first synthetic aperture radar image 380*a* and the second synthetic aperture radar image 380*b* in different ways. For example, the controller 330 may be configured to assess whether both the first synthetic aperture radar image 380*a* and the second synthetic aperture radar image 380*b* comprise any amplitude peaks within a respective pre-defined set D1, D2 of distances and angles. This alternative is illustrated in FIG. 7, where the pre-defined sub volume 355 is located in an overlapping portion of the scanned volume. It is understood that the pre-defined sub volume 355 corresponds to unique ranges of distances and angles for each of the two radar sensors 310*a*, 310*b*, i.e. there will be one predefined set D1 of distances and angles defined for the first radar sensor 310*a* corresponding to the pre-defined sub volume 355, and another predefined set D2 of distances and angles defined for the second radar sensor 310*b* corresponding to the pre-defined sub volume 355.

Alternatively, or additionally, the controller 330 may be configured to detect presence of the potential obstacle 160 within the pre-defined sub volume 355 by evaluating whether the first synthetic aperture radar image 380*a* or the second synthetic aperture radar image 380*b* comprise any amplitude peaks within a respective pre-defined set D1, D2 of distances and angles. This may be achieved by defining the pre-defined sub volume extending from the left via the centre to the right, so as to encompass both overlapping portions and non-overlapping portions. It is also conceivable to use more than one pre-defined sub volume. For example, peripheral pre-defined volumes may be defined on non-overlapping left and right portions to detect potential moving obstacles on a collision course with the autonomous moving object, and a central pre-defined sub volume may be defined in central overlapping portions of the scanned volume so as to detect potential obstacles in front of the autonomous moving object. It is understood that the first synthetic aperture image and the second synthetic aperture image may be analyzed in combination. This may allow for improving spatial resolution of potential obstacles in case both the first and second synthetic aperture image comprises amplitude peaks pertaining to the obstacle.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

What is claimed is:

1. An autonomous moving object comprising:
    a radar sensor mounted on the autonomous moving object and configured to scan a volume in front of the object during a movement of the object along a movement path, and
    a radar signal processor configured to:
        acquire a sequence of radar responses, each radar response of the sequence being acquired at a different position of the autonomous moving object along the movement path, and
        perform synthetic aperture radar processing of at least parts of the acquired sequence of radar responses to obtain a synthetic aperture radar image representing response amplitude as a function of at least distance and angle with respect to the radar sensor,
    the autonomous moving object further comprising:
    a controller configured to detect presence of a potential obstacle within a pre-defined sub-volume in front of the autonomous moving object by evaluating whether the synthetic aperture radar image comprises any amplitude peaks, within a pre-defined set of distances and angles, and
    wherein the controller is configured to, in response to detecting presence of a potential obstacle, output a control command configured to cause a changed movement of the autonomous moving object.

2. The autonomous moving object according to claim 1, wherein the synthetic aperture radar image is a two-dimensional image representing response amplitude as a function of distance and angle with respect to the radar sensor.

3. The autonomous moving object according to claim 1, wherein the synthetic aperture radar image is a three-dimensional image representing response amplitude as a function of distance, elevation and azimuth with respect to the radar sensor.

4. The autonomous moving object according to claim 1, wherein presence of the potential obstacle is detected by evaluating whether the synthetic aperture radar image comprises any amplitude peaks exceeding a threshold amplitude.

5. The autonomous moving object according to claim 1, wherein the radar responses of the sequence are acquired at positions along the movement path separated by ¼ of a wavelength or less.

6. The autonomous moving object according to claim 1, wherein each radar response of the sequence comprises a data container of I/Q samples, wherein each I/Q sample pertains to a specific distance from the autonomous moving object.

7. The autonomous moving object according to claim 1, wherein the synthetic aperture radar image is obtained based on a discrete Fourier transform, or fast Fourier transform, of the sequence of radar responses.

8. The autonomous moving object according to claim 1, wherein the controller being configured to detect presence of a potential obstacle within a pre-defined sub-volume in front of the autonomous moving object by evaluating whether the synthetic aperture radar image comprises any amplitude peaks comprises iteratively:
    finding a data point of maximum amplitude in the synthetic aperture radar image,
    applying a mask function to remaining data points of the synthetic aperture radar image,
        wherein the mask function has a maximum value being located at a position of the found data point and being at least equal to the found maximum amplitude, and wherein values of the mask function are lower than said maximum value at least for data points being distanced from the found data point of maximum amplitude by more than a threshold distance,
        wherein the mask function is applied by nulling or invalidating remaining data points which have values below said mask function so as to obtain a processed image, and
    repeating the above on said processed image, and, later, on subsequently obtained processed images, until all amplitude peaks are found, and
    said controller being configured to evaluate if any of the above found amplitude peaks are within the pre-defined set of distances and angles.

9. The autonomous moving object according to claim 8, wherein, for at least said data points being distanced from the found data point of maximum amplitude by more than a threshold distance:
    the mask function decreases as a function of increasing distance from the position of the found data point.

10. The autonomous moving object according to any one of claim 1, wherein the synthetic aperture radar image is obtained from synthetic aperture radar processing performed on a subset of the acquired sequence of radar responses,
    wherein the radar signal processor is further configured to perform synthetic aperture radar processing of one or more further subsets of the acquired sequence of radar responses to obtain one or more further synthetic aperture radar images each representing response amplitude as a function of distance and angle with respect to the radar sensor,
    wherein said subset and each of said one or more further subsets being time-shifted with respect to each other.

11. The autonomous moving object according to claim 10, wherein the controller being configured to detect the presence of a potential obstacle comprises:
    the controller being configured to evaluate whether amplitude peaks of said synthetic aperture radar image and amplitude peaks of said one or more further synthetic aperture radar images correspond to overlapping spatial regions within the scanned volume.

12. The autonomous moving object according to claim 10, wherein the controller being configured to detect the presence of a potential obstacle further comprises:
    the controller being configured to track a potential moving obstacle by estimating a position and a velocity thereof, wherein said estimation comprises comparing said amplitude peaks of the synthetic aperture radar image and amplitude peaks of the one or more further synthetic aperture radar images to determine if there are any amplitude peaks associated with a moving obstacle, and if there are any amplitude peaks associated with a moving obstacle:

the controller being further configured to evaluate if the potential moving obstacle is on a collision course with the autonomous moving object.

13. The autonomous moving object according to claim 1, wherein the radar sensor is a first radar sensor and the radar signal processor is a first radar signal processor, and wherein said first radar signal processor is configured to acquire a first sequence of radar responses so as to obtain a first synthetic aperture radar image, the autonomous moving object further comprising:

a second radar sensor and a second radar signal processor, said second radar signal processor being configured to acquire a second sequence of radar responses, and perform synthetic aperture radar processing of the acquired second sequence of radar responses to obtain a second synthetic aperture radar image representing response amplitude as a function of distance and angle with respect to the second radar sensor, wherein the first radar sensor and the second radar sensor are configured to scan at least partly non-overlapping volumes in front of the object, and wherein the controller being configured to detect presence of the potential obstacle within the pre-defined sub volume by evaluating whether the first synthetic aperture radar image and/or the second synthetic aperture radar image comprise any amplitude peaks within a respective pre-defined set of distances and angles.

14. The autonomous moving object according to claim 1, wherein the autonomous moving object is one or more from the list of: robotic vacuum cleaner, robotic lawn mower, warehouse robots.

* * * * *